United States Patent

Lewis

[11] Patent Number: 5,968,641
[45] Date of Patent: Oct. 19, 1999

[54] COMPLIANT THERMOSET MATRIX, FIBER REINFORCED, SYNTACTIC FOAM SANDWICH PANEL

[75] Inventor: Richard A. Lewis, El Segundo, Calif.

[73] Assignee: TRW Inc., Redondo Beach, Calif.

[21] Appl. No.: 09/067,220

[22] Filed: Apr. 28, 1998

[51] Int. Cl.[6] .............................. B29C 53/04; B32B 5/22
[52] U.S. Cl. ..................... 428/298.1; 156/221; 156/222; 156/307.3; 156/330; 264/321; 264/331.11; 264/DIG. 4; 428/299.1; 428/301.4; 428/319.1
[58] Field of Search .............................. 428/298.1, 299.1, 428/301.4, 304.4, 319.1; 156/221, 222, 307.3, 330; 264/321, 331.11, DIG. 4

[56] References Cited

U.S. PATENT DOCUMENTS

| | | |
|---|---|---|
| 4,092,296 | 5/1978 | Skiff ..................................... 260/47 EP |
| 5,248,360 | 9/1993 | Jones, Jr. et al. ........................ 156/166 |
| 5,520,976 | 5/1996 | Giannetti et al. ....................... 428/36.3 |
| 5,665,461 | 9/1997 | Wong et al. ............................. 523/218 |

*Primary Examiner*—Blaine Copenheaver
*Attorney, Agent, or Firm*—Michael S. Yatsko

[57] ABSTRACT

A composite laminate structure, and a method for its fabrication. The structure includes a syntactic core layer (10) including an epoxy system catalyzed by a Lewis acid, and two face skin layers (12), each of which has multiple graphite fibers laid up in a polycyanate matrix resin catalyzed by cobalt. After thermal curing, the laminate structure has the unusual, but highly desirable property that it is compliant enough to be conformed at room temperature to a different shape, without damage to the structure. The structure may be later conformed to other shapes or conformed to its original shape, again without damage. Structures of unusual shapes can, therefore, be easily fabricated from sheets of the laminate material formed in one (1) convenient initial shape, such as a flat panel.

5 Claims, 1 Drawing Sheet

COMPLIANT THERMOSET MATRIX, FIBER REINFORCED, SYNTACTIC FOAM SANDWICH PANEL

BACKGROUND OF THE INVENTION

This invention relates generally to thermoset composite structural materials and, more particularly, to thermoset sandwich structures for thermal management and passive damping applications. Thermoset composite sandwich structures are common. They typically have a relatively thick core material surrounded by face skins of much thinner material. The core material generally provides a rigid matrix. The face skins provide structural reinforcement and typically include high modulus fibers or graphite or similar materials in a resin base, to provide rigidity in selected directions, and high thermal conductivity. Thermoset composite panels may be used as thermally conductive panels on spacecraft, or as structural materials in a variety of applications.

Unfortunately, although structures of this type have desirable strength and lightness of weight, they are almost completely non-compliant once they have been processed at elevated temperatures and "cured." The rigid matrix locks the structures in a final shape that is typically determined by a mold in which they are fabricated. Complex shapes have to be fabricated using appropriately shaped molds or tools, the use of which, of course, increases the cost of the structures. Applying heat and pressure to a cured thermoset sandwich structure to adjust its shape has only a limited effect, at best, and may result in damage to the structure caused by mechanical failure of the matrix. Moreover, non-compliant structural members may need active and passive damping for use on spacecraft.

There is a need for thermoset sandwich structures that have high thermal conductivity, but still exhibit compliant behavior that permits modification of the structural profile after curing, and avoids or reduces the need for active or passive damping. The present invention satisfies this need.

SUMMARY OF THE INVENTION

The present invention resides in a thermoset sandwich structure that is rigid and lightweight, yet compliant. Briefly, and in general terms, the structure of the invention comprises a compliant thermoset composite structure, comprising a syntactic core layer including an epoxy system catalyzed by a Lewis acid; and two face skin layers, on opposite faces of the core layer, each face layer including multiple graphite fibers laid up in a polycyanate matrix resin catalyzed by cobalt. The composite structure is thermally cured to assume an initial shape in which it exhibits desired properties of stiffness and strength and thermal conduction, but is compliant enough to allow slow mechanical deformation to a new desired shape without damage to the structure. More specifically, in the compliant thermoset composite structure of the invention, each of the face layers includes three unidirectional layers of graphite fibers, laid up in equally angularly spaced directions to provide quasi-isotropic strength, stiffness and thermal conductivity.

The invention may also take the form of a method for fabricating a compliant thermoset composite structure, comprising the steps of forming a syntactic core to include an epoxy system and a Lewis acid catalyst; forming two face skin layers, on opposite faces of the core layer, each face skin layer having multiple graphite fibers laid up in a polycyanate matrix with a cobalt catalyst; thermally treating the core and face skin layers to catalyze the epoxy system and the polycyanate matrix, including thermally curing the composite structure in an initial shape; and applying force to the cured composite structure, after thermal curing, to conform the structure to a new desired shape, wherein the structure assumes desired strength and stiffness properties in the new desired shape, without damage to the core or face skin layers. More specifically, the step of forming the face skin layers includes laying up three layers of graphite fibers in different directions, to produce quasi-isotropic strength, stiffness and thermal conductivity properties. The method may also include the step of applying force to the structure, to conform it to another desired shape, wherein the structure assumes desired strength and stiffness properties in the new desired shape, without damage to the core or face skin layers.

It will be appreciated from the foregoing summary that the present invention represents a significant advance in the field of composite thermoset structures. In particular, the invention provides a structure that can be shaped after thermosetting, but without re-heating and without damage to the structural material. Other aspects and advantages of the invention will become apparent from the following more detailed description, taken together with accompanying drawing.

DESCRIPTION OF THE PREFERRED EMBODIMENT

Figure 1:
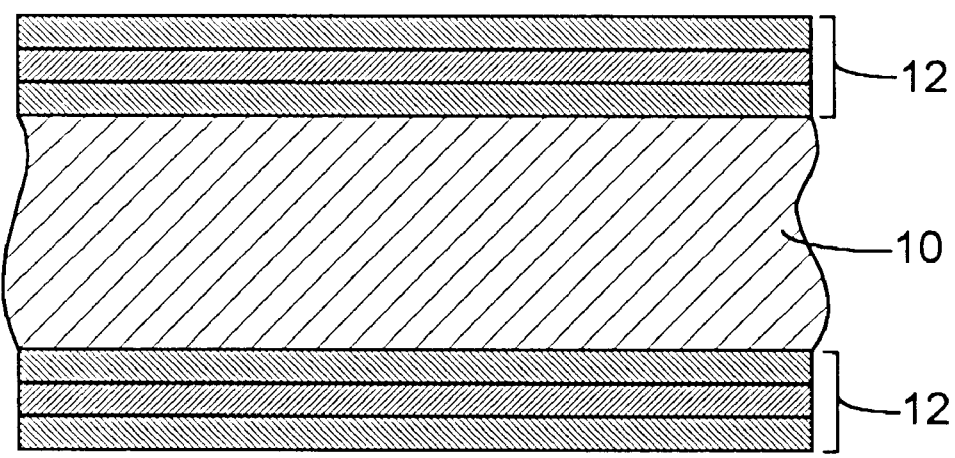
FIG. 1 is a cross-sectional view, not to scale, of a portion of a thermoset sandwich structure in accordance with the present invention.

As shown in the drawing for purposes of illustration, the present invention pertains to thermoset composite sandwich structures. It is generally believed that a sandwich structure having a rigid core matrix and faced on each side with high modulus structural fibers is, when heat processed and cured, inherently rigid and non-compliant. That is to say, any attempt to reshape the structure by the application of pressure, however gradual, and even if accompanied by reheating, will be doomed to failure.

In accordance with the present invention, a thermoset composite sandwich structure has the apparently inconsistent properties that it is rigid and lightweight, like other sandwich structures, but is also compliant enough to be easily reshaped by the slow application of bending forces, at room temperature. The illustrative embodiment of the invention includes high modulus graphite fibers that contribute to efficient thermal transfer along the length of the fibers, while the compliant nature of the structure provides a damping effect on the overall dynamic mechanical behavior of the sandwich structure.

As shown in FIG. 1, the structure of the invention includes a syntactic foam core 10 and two face skins 12. In the illustrative embodiment of the invention, the syntactic foam core 10 has a thickness of approximately 0.050 inch (approximately 1.27 mm), and each face skin 12 has a thickness of only 0.003 inch (approximately 0.076 mm). A syntactic foam core 10 is a cellular polymer made by dispersing rigid, microscopic spheres in a fluid polymer and then curing it. The core 10 is formed in an epoxy system catalyzed with a Lewis acid. (A Lewis acid is a substance that can accept an electron pair from a base. Examples are $AlCl_3$, $BF_3$ and $SO_3$). Each face skin 12 has three layers of graphite fibers, as indicated by the three layers in the drawing. The graphite fibers are laid up in quasi-isotropic form, i.e. with the fibers in each layer at sixty degrees to each other to provide a high modulus in three equally spaced directions. The fibers are laid up in a polycyanate resin catalyzed with cobalt.

The resulting sandwich structure is initially cured (thermoset) at approximately 350° F., in a desired shape such as a flat panel, but then may be reformed by the gradual application of pressure into a new shape or profile, without apparent damage to the fibers, the laminating matrix resin, or the syntactic foam core 10. Moreover, the new shape will be retained until the panel is forced to assume another shape, which may even be the original shape. Thus, the reshaping process is reversible, and reshaping has no apparent detrimental effects on the structural properties of the laminate structure.

Although the specific mechanism that provides compliance to the laminate structure is not completely understood, it is believed that the combination of resin chemistries (polycyanate/cobalt and epoxy/Lewis acid) inhibits the normal trimerization of the polycyanate matrix resin. It is thought that the Lewis acid cure mechanism affects the linearity of the polymer's crosslinking behavior. The resultant linear polymer chain is flexible, yet rigid. This imparts a genuine flexibility and memory to the laminate, allowing it to be reformed to a new shape, which is retained until the structure is again reformed.

Since the laminate cures at 350° F., it is well suited for space applications. Further, the laminate meets all standard space flight requirements for out-gassing. Using the invention, high modulus panels can be made precisely and inexpensively in a flat configuration. They can be later integrated into curved structures without having to rely on complex geometry lay-up tooling. The cost savings involved are highly significant. Starting with simple flat panels, a designer can fashion tubes, dishes, curvilinear and compound shapes using these flat, pre-cured conformal panels. Because the laminate "remembers" each new shape easily, it appears that there is only a very low residual stress in the laminate after being reformed, probably due to the highly flexible polymer matrix.

The techniques of the invention have application to thermally conductive panels for spacecraft, optical benches, and conformal panels for tooling applications in advanced composite manufacturing, for antenna structures, masts, and equipment compartments, for solar array panels, for propellers and wind turbine blades, for automobile and other vehicle body panels, and for building materials in general. Because panels made in accordance with the invention can be formed into any of a variety of shapes without the application of heat and without expensive tooling, even items that are not needed in large quantities can be fabricated inexpensively. Structures on spacecraft fall squarely into this category because spacecraft are not normally produced in large numbers. Using the invention, a specially ordered antenna dish, for example, can be formed from a flat thermoset laminate panel.

It will be appreciated from the foregoing that the present invention represents a significant advance in the field of composite thermoset structures. In particular, the invention provides a convenient way to manufacture laminate panels that have desired degrees of stiffness, strength and thermal conductivity, but may still be shaped as desired after thermal curing. It will also be appreciated that, although a specific embodiment of the invention has been described in detail for purposes of illustration, various modifications may be made without departing from the spirit and scope of the invention.

What is claimed is:

1. A compliant thermoset composite structure, comprising:

a syntactic core layer including an epoxy system catalyzed by a Lewis acid; and two face skin layers, on opposite faces of the core layer, each face layer including multiple graphite fibers laid up in a polycyanate matrix resin catalyzed by cobalt;

wherein the composite structure is thermally cured to assume an initial shape in which it exhibits desired properties of stiffness and strength, but assumes a new desired shape when subjected to slow deformation at room temperature without damage to the structure.

2. A compliant thermoset composite structure as defined in claim 1, wherein each of the face layers includes three unidirectional layers of graphite fibers, laid up in equally angularly spaced directions to provide quasi-isotropic strength, stiffness and thermal conductivity.

3. A method for fabricating a compliant thermoset composite structure, comprising the steps of:

forming a syntactic core to include an epoxy system and a Lewis acid catalyst;

forming two face skin layers, on opposite faces of the core layer, each face skin layer having multiple graphite fibers laid up in a polycyanate matrix with a cobalt catalyst;

thermally treating the core and face skin layers to catalyze the epoxy system and the polycyanate matrix, including thermally curing the composite structure in an initial shape; and applying force to the cured composite structure, after thermal curing, to conform the structure to a new desired shape, wherein the structure assumes desired strength and stiffness properties in the new desired shape, without damage to the core or face skin layers.

4. A method as defined in claim 3, wherein the step of forming the face skin layers includes laying up three layers of graphite fibers in different directions, to produce quasi-isotropic strength, stiffness and thermal conductivity properties.

5. A method as defined in claim 3, and further comprising the step of:

applying force to the structure, to conform it to another desired shape, wherein the structure assumes desired strength and stiffness properties in the new desired shape, without damage to the core or face skin layers.

* * * * *